(12) United States Patent
Tobin et al.

(10) Patent No.: US 8,150,782 B2
(45) Date of Patent: *Apr. 3, 2012

(54) METHODS AND APPARATUS FOR RECOGNIZING COMPACT DISCS AND ISSUING CORRESPONDING CREDITS

(75) Inventors: Christopher M. Tobin, Central Valley, NY (US); Adrienne Lalla, College Point, NY (US)

(73) Assignees: Sony Corporation (JP); Sony Music Entertainment Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,222

(22) Filed: Aug. 8, 2011

(65) Prior Publication Data

US 2011/0295676 A1 Dec. 1, 2011

Related U.S. Application Data

(60) Continuation of application No. 11/999,628, filed on Dec. 6, 2007, now Pat. No. 7,996,334, which is a division of application No. 09/903,137, filed on Jul. 11, 2001, now Pat. No. 7,333,935.

(51) Int. Cl.
*G06Q 10/00* (2012.01)
(52) U.S. Cl. ............ 705/901; 705/1.1; 705/59; 705/902
(58) Field of Classification Search .................. 705/901, 705/1.1, 59, 902
See application file for complete search history.

(56) References Cited

U.S. PATENT DOCUMENTS

| | | | |
|---|---|---|---|
| 5,051,822 | A | 9/1991 | Rhoades |
| 5,309,564 | A | 5/1994 | Bradley et al. |
| 5,349,643 | A | 9/1994 | Cox et al. |
| 5,400,402 | A | 3/1995 | Garfinkle |
| 7,151,888 | B2 | 12/2006 | Matsumura et al. |
| 7,804,958 | B2 | 9/2010 | Kahn et al. |
| 2004/0044779 | A1 | 3/2004 | Lambert |

FOREIGN PATENT DOCUMENTS

WO 9725816 7/1997

OTHER PUBLICATIONS

Archived web pages of "www.divx.com" printed through www.archive.org labeled as Information on DivX, 1998-2001.
Shelly K Schwartz, D1VX on the Defensive hereinafter known as Schwartz, Dec. 11, 1998.
An article "Concurrent Computer and VOD Pty Ltd Take Video-On-Demand 'Down Under' With Australia's First Commercial Deployment", Jun. 27, 2001.

*Primary Examiner* — Naresh Vig
(74) *Attorney, Agent, or Firm* — Lerner, David, Littenberg, Krumholz & Mentlik, LLP (57) ABSTRACT

For possible use in an electronic content distribution system, automatic recognition of compact discs or other storage media containing particular content, and corresponding account crediting is described. In an electronic content distribution system, such as those providing music available by digital downloading or streaming technologies, a user may ordinarily pay a full price to receive the music. A user who possesses and apparently owns a compact disc containing particular content can be conveniently offered a discount or credit usable towards the purchase of the analogous particular content in a form provided by the electronic content distribution system. Preferably, compact discs are uniquely identified by determining whether their digital fingerprint matches a known reference fingerprint for a compact disc containing the particular content.

17 Claims, 5 Drawing Sheets

METHODS AND APPARATUS FOR RECOGNIZING COMPACT DISCS AND ISSUING CORRESPONDING CREDITS

CROSS-REFERENCE TO RELATED APPLICATIONS

This application is a continuation of U.S. application Ser. No. 11/999,628, filed on Dec. 6, 2007, now U.S. Pat. No. 7,996,334, which is a divisional of application Ser. No. 09/903,137, filed on Jul. 11, 2001, now U.S. Pat. No. 7,333,935, the disclosures of which are incorporated herein by reference.

BACKGROUND OF THE INVENTION

This application relates generally to methods and apparatus for content distribution and more particularly to methods and apparatus for recognizing the possession of optical discs containing particular works, and issuing corresponding credits usable towards receiving the particular works in an electronic content distribution system.

One problem with conventional electronic content distribution systems is that many users believe that all content should be available at no cost. Of course, this view may fail to appreciate the intellectual property rights underlying such content, and a system relying solely upon free distribution may diminish artists' incentives to produce high quality works. Nevertheless, the possible existence of this perception is a market reality in promoting electronic content distribution systems.

Another issue with such distribution systems is the possible consumer perception that ownership of content in one form allows unmitigated duplication of the content. For example, many consumers have purchased compact discs containing musical works. These consumers may feel that their purchase of a particular compact disc, containing a particular work, entitles them to freely duplicate, distribute and modify the particular work. This represents another market place reality—some consumers may be unlikely to purchase a work available via an electronic content distribution system knowing that they have previously purchased a compact disc containing the work.

SUMMARY OF THE INVENTION

This invention relates to electronic content distribution systems (e.g. those that provide content by digital download and/or streaming technologies), and particularly to increasing the marketability of the products and services provided by such systems.

In one aspect, embodiments of the invention provide incentives for consumers to purchase content in an electronic content distribution system, by automatically recognizing that the consumer possesses a particular compact disc (or other optical storage medium, such as a DVD), and then providing a credit redeemable towards usage rights for related content. Thus, for example, if the user possesses and therefore presumably owns a compact disc containing a particular work, the user may receive a credit towards the purchase of the particular work in an electronic content distribution system.

Some embodiments of the invention, particularly those that operate with older CDs, will read a digital fingerprint for the CD, automatically recognize it based upon the fingerprint, and then prompt the user to purchase a digital download, stream, or other usage right for the particular works contained on the CD. For some newer CDs, recognition could be implemented through a unique identifier located on the CD, or through fingerprinting.

Other features could also be provided, in lieu of credits. For example, one could restrict access to certain web sites/areas to those who prove that they possess a particular CD or collection of CDs.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
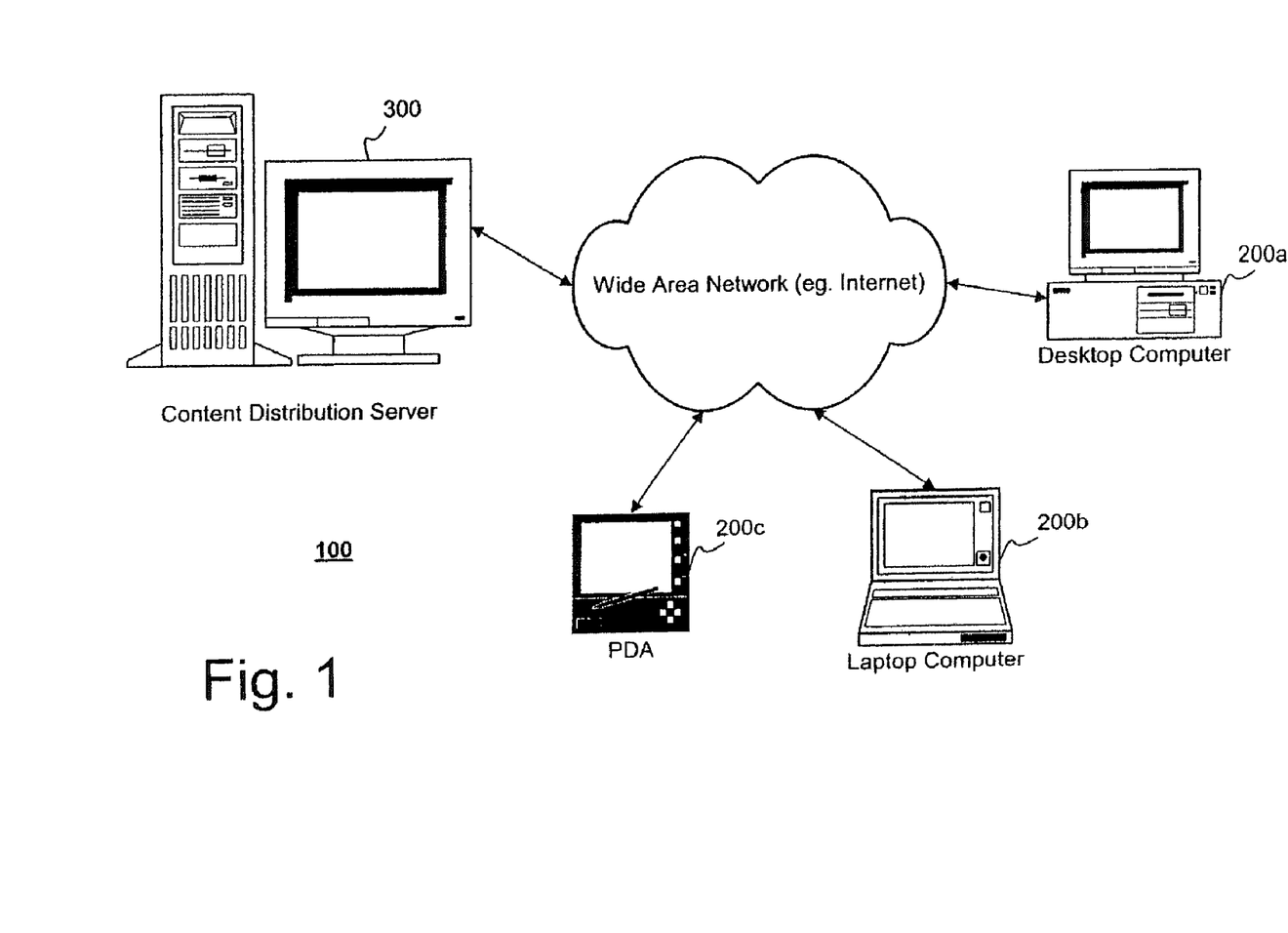
FIG. 1 is a schematic diagram illustrating an embodiment of a wide area network of devices in which an electronic content distribution system may operate.

FIG. 1 illustrates a wide area network based system 100 in which an electronic content distribution system may operate. Particularly, various client devices 200, such as a desktop computer 200a, laptop computer 200b, or personal digital assistant (PDA) 200c may communicate with a content distribution server 300 over the wide area network. In such a system, the content distribution server 300 contains a library of content, such as music, which is delivered to the client devices 200 in electronic form.

An example of a wide area network is the Internet. In this embodiment, the various client devices 200 and the content distribution server would include conventional technology for communicating over the Internet. The content to be distributed is stored or controlled by the content distribution server 300. For example, the content distribution server 300 may store various musical works in any of various conventional file formats (e.g. MP3, ATRAC3, WAV). The content may then be distributed electronically. Two examples of electronic content distribution are streaming and downloading. In a streaming environment, the content is played by the client device as it arrives, and a copy of the streamed content is not typically kept after the content has been played. The client device may, for example, include a browser configured to play the streaming content. Other content, such as video, may also be streamed, and is fully contemplated by embodiments of this invention.

Downloading involves the transmission of a file from one computer to another connected to the network. For example, the client device "downloads" a file for a musical work, such as an MP3 file, and on completion of the download the client device typically stores the entire file. The term downloading is typically used from both the client and server perspectives. Thus, the act of downloading may be said to occur at either or both the client or the server, when the file is transmitted from the server to the client. In other words, the server "downloads" the content file to the client, or the client "downloads" the content file from the server. Various conventional technologies, such as the File Transfer Protocol (FTP), may by used to download content files.

In contrast to streaming applications, in downloading applications, the client device typically maintains a copy of the file after the content is played. This allows the content to be played back numerous times. The content is typically encrypted, and the client device is provided with decryption information or algorithms to allow playback. Usage rules may dictate how many times or how long the content may be played back by a particular client device.

Figure 2:
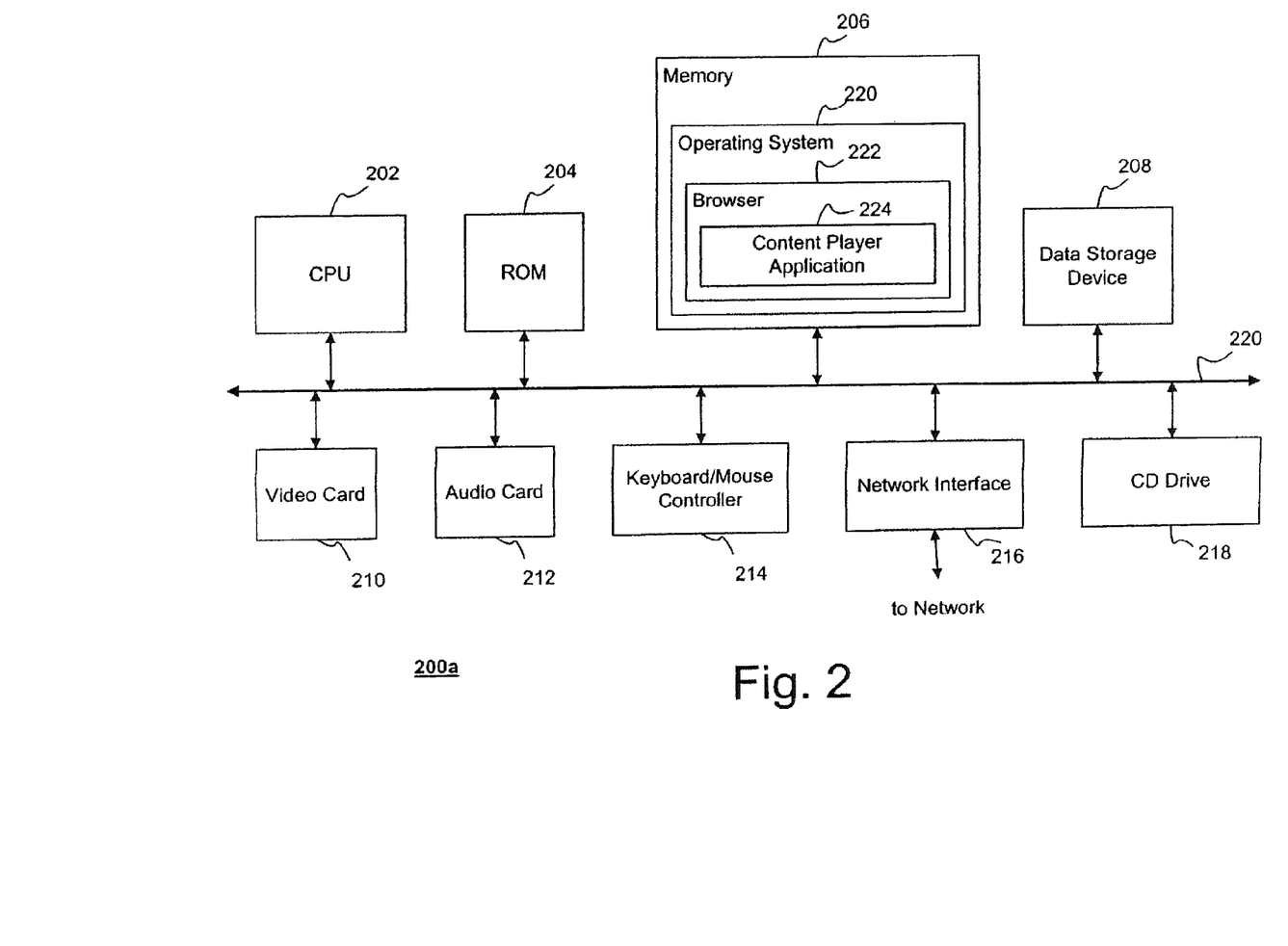
FIG. 2 is a block diagram illustrating an embodiment of a client device including a content player application configured in accordance with the present invention.

FIG. 2 is a block diagram illustrating an embodiment of a desktop computer 200a, including a CPU 202, ROM 204, memory 206, data storage device 208, video card 210, audio card 212, keyboard/mouse controller 214, network interface 216, and CD Drive 218, each coupled to a bus 220 in conventional fashion. The CPU 202 is a conventional processor, such as the PENTIUM™ type provided by Intel Corporation of Santa Clara, Calif. The CPU 202 executes instructions, such as those provided in ROM 204 and/or memory 206. ROM 204 is a read only memory, which retains its stored information even while it is disconnected from a power supply. The ROM 204 may, for example, store instructions for a boot up sequence. Memory 206 is preferably volatile memory for storing instructions and information used during ordinary operation, such as those provided in the computer operating system. The data storage device 208 provides long term data storage, and is preferably a magnetic or magneto-optic "hard disk" device. The video card 210 and audio card 212 respectively provide the interface between the desktop computer 200a and its monitor and speakers (not shown). The keyboard mouse controller 214 provides an interface between the desktop computer 200a and the keyboard and mouse that are used to provide input to the desktop computer 200a. The network interface 216 is a conventional network interface card that interfaces a local network line and the desktop computer 200a. The network interface card may be a conventional ethernet card, or may be a multipurpose interface for communication over a ethernet, ISDN and/or other networks. Access to the Internet can be provided through the network interface 216. The CD drive 218 reads optical storage media including compact discs and DVDs (which may be referred to as digital versatile discs or digital video discs).

It is noted that a desktop computer 200a may include different items than those noted in the described embodiment. For example, 1/0 ports for interfacing with printers and plotters, a floppy disk drive, and various other features may be included, and various elements may be excluded. Also, although Internet access is described in connection with a network interface card, a modem connected to a conventional phone line can be used for "dial up" Internet access. The ordinarily skilled artisan will recognize the various alternatives for the desktop computer 200a.

Still referring to FIG. 2, the memory 206 also includes an operating system 220, browser 222 and content player application 224. The operating system 220 is a program that is typically loaded from the long term data storage device 208 (e.g., hard disk) to the main memory 206 during a boot up sequence. The operating system 220 manages the other programs in the computer, which are referred to as applications, and includes particular instructions and operations that can be used by the applications, either directly or through an application program interface. The operating system 220 also handles exchanges with devices connected to the computer (e.g., printers, disk drives, etc.), manages memory use, and allocates computing resources in multitasking environments. Preferably, the operating system 220 is WINDOWS95 or WINDOWS98, as provided by Microsoft, Inc. of Redmond, Wash.

The browser 222 includes instructions for displaying information, for linking to other information, and for transferring information to and from the desktop computer 200a. For example, the browser 222 includes instructions for displaying web pages using HTML, and transfers information using HTTP. Preferably, the browser 222 is the INTERNET EXPLORER, as provided by Microsoft. Various alternative browsers, such as the NAVIGATOR, as provided by Netscape, Inc. can be provided. Although the browser 222 is shown as an application operating within the management of the operating system 220, it may alternatively be an integrated part of the operating system 220. The browser 222 also preferably works in conjunction with a content player application 224 that is used to play content. Various conventional content players such as Microsoft Windows Media Player™, or RealPlayer™ by Real Networks. The content player application 224 may be configured to include the particularized credit functionality described in connection with embodiments of the present invention, or may communicate with software that independently provides such functionality. Although the desktop computer 200a has been described, other client devices 200 such as the laptop computer 200b or PDA 200c are configurable to provide similar functionality as the basis for providing embodiments of the present invention.

Figure 3:
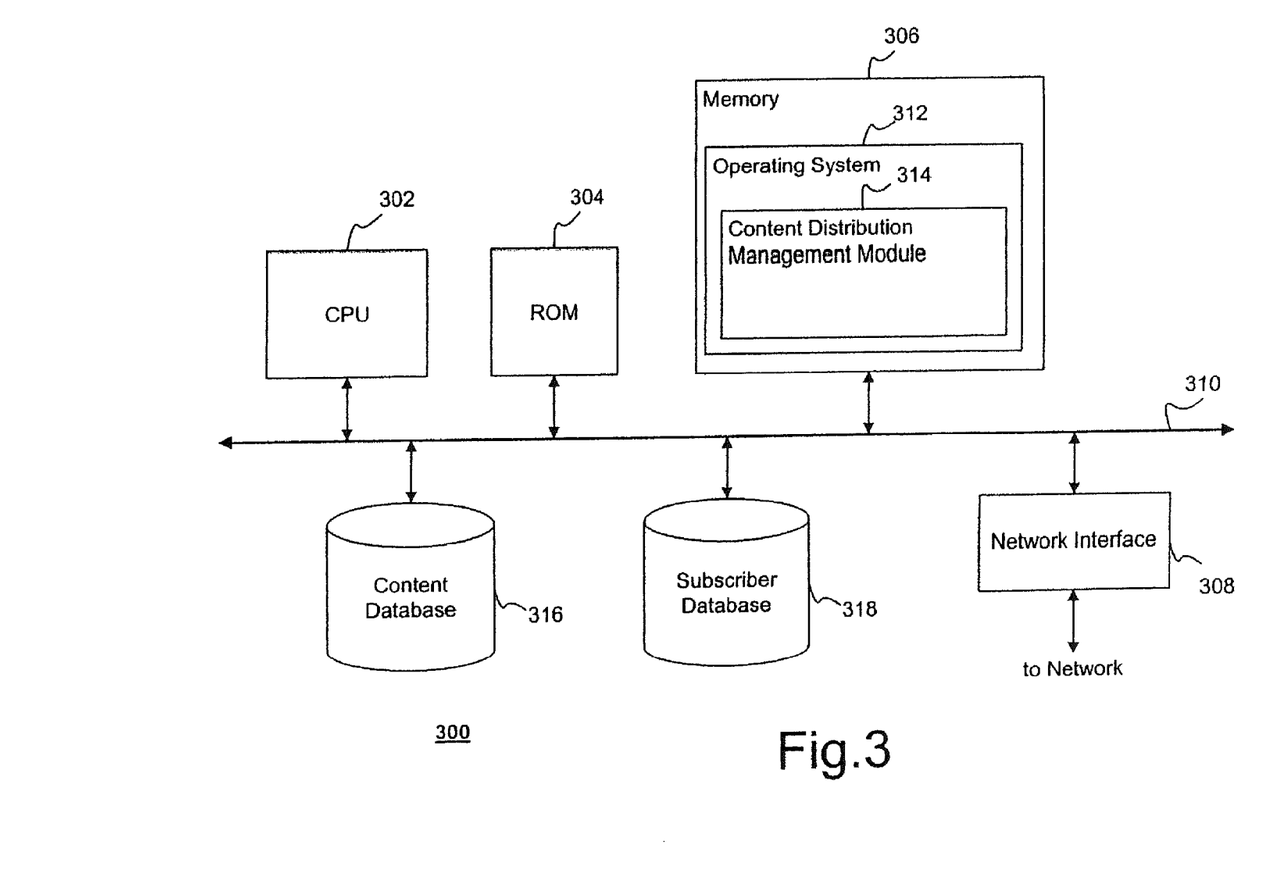
FIG. 3 is a block diagram illustrating an embodiment of a content distribution server including a content distribution management module configured in accordance with the present invention.

Referring now to the block diagram of FIG. 3, an embodiment of a content distribution server 300 configured in accordance with an embodiment of the present invention includes a CPU 302, ROM 304, memory 306 and network interface 308 connected via a bus 310 and operating in a fashion that is analogous to that described for the desktop computer 200a above, which is understood by the ordinarily skilled artisan, and which need not be repeated herein for an understanding of the invention. The content distribution server 300 also includes an operating system 312, which may be any conventional operating system, and a content distribution management system 314, which functions to provide particularized credit to a user of an electronic content distribution system, as will be described further below.

The content distribution server 300 further includes a content database 316 and a subscriber database 318. The content database 316 includes the library of content that may be available to a user. For example the content database 316 may store MP3 files to be downloaded or files that are streamed to client devices 200. The subscriber database 318 includes account information corresponding to users of the electronic content distribution system. For example, the subscriber database 318 may include the name and contact information for a user, along with their credit information. Additionally, the subscriber database 318 may maintain a list of registered client devices corresponding to the user, as well as information that may be used to validate access by registered devices.

Furthermore, the subscriber database 318 may maintain an identification of works that are accessible by the user. Thus, for example, when a user accesses the content distribution server 300 remotely through the Internet, the server 300 may validate the accessing device, determine whether a request for a particular content is valid (such as by determining whether the user has previously ordered the particular work and/or determining their account status), and deliver the particular content as specified.

The content distribution management module 314 and/or the content player application (224, FIG. 2) are configured to recognize a particular compact disc (or other optical storage medium, such as a DVD) and provide a credit usable towards usage rights for related content. Thus, for example, if a user possesses and therefore presumably owns a compact disc containing a particular work, the user may receive a credit towards the purchase of a download or stream of the particular work in an electronic content distribution system.

For example, the user might own the CD by the artist "R.E.M." entitled

"Murmur." In conjunction with their digital music subscription service, the user could put this CD in the CD drive for their desktop computer or other client device. Client (or server side) software could then automatically recognize the CD by digital fingerprint technology, or reading a unique identifier, as described further below. The server would automatically recognize the client/user, and display recognition of the content, and a corresponding incentive. For example, the message might indicate "Since you already own R.E.M. Murmur, we are offering a full download of the album in MP3 format for 50% off our regular price." Or, "Since you already own R.E.M. Murmur, we are offering a 50 points that can be used towards listening to any songs on that CD under our streaming audio subscription service."

Figure 4:
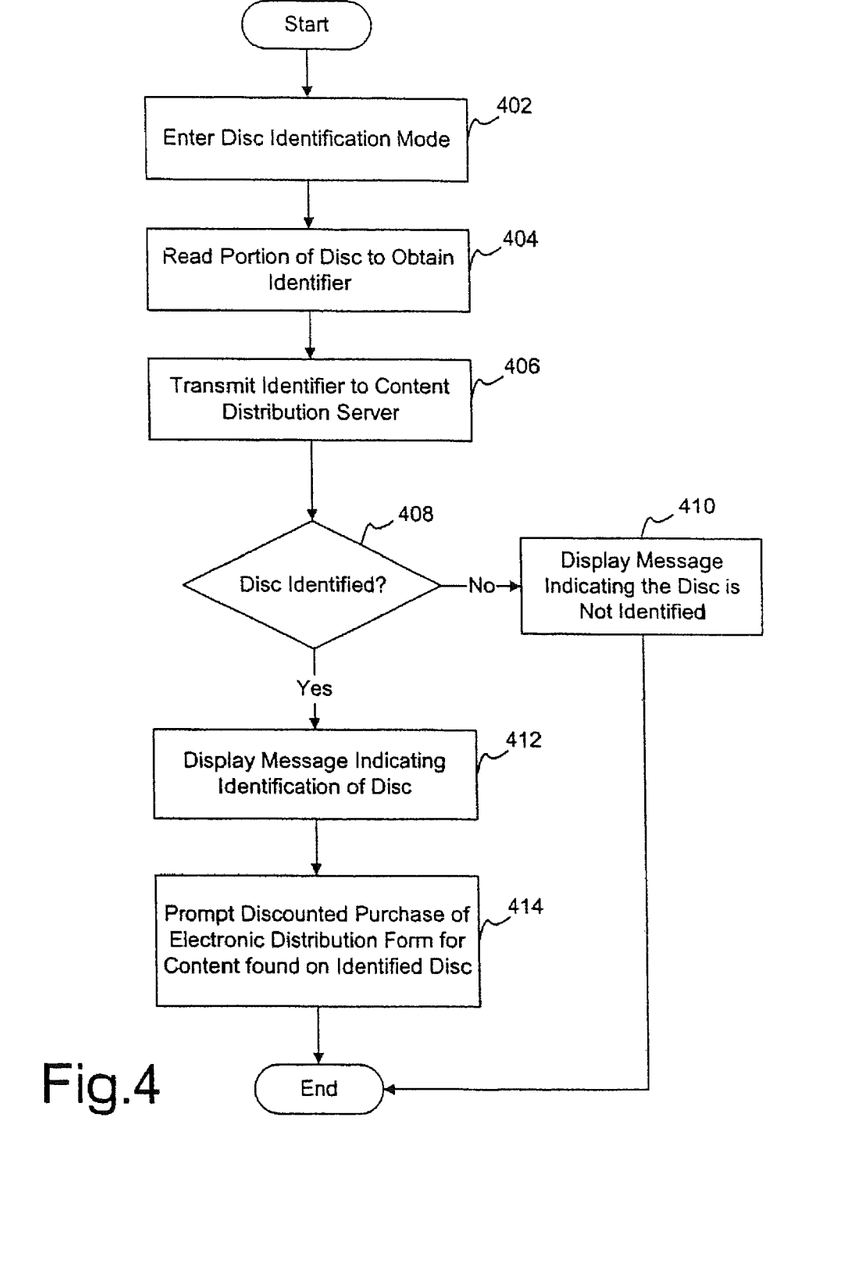
FIG. 4 is a flow diagram illustrating an embodiment of a method for receiving particularized credit in an electronic content distribution system in accordance with the present invention.

The flow diagrams of FIG. 3 and FIG. 4 illustrate the functionality of providing particularized credit, respectively from the client and server perspectives. Referring first to FIG. 4, typically at some point in a session between the client device and the content distribution server, the user may enter 402 a disc identification mode, wherein the user commences a request for particular credit corresponding to their ownership of a particular compact disc (or other optical storage medium). At this point, the user will typically insert the disc into the CD drive for the client device. Note that the CD drive may also be part of a CD player/CD changer that is part of a home network connected to the user's client device (computer). These and other configurations that would produce a similar overall system are of course contemplated and encompassed by the present invention.

Once the disc is inserted, it is then read 404 to obtain an identifier for the disc. Preferably, the identifier is a digital fingerprint that uniquely corresponds to those discs storing particular content. Thus, for example, each compact disc for the album "Murmur" by "R.E.M." would reveal the same fingerprint.

Generally, conventional compact discs are formatted according to a specification which is known in the industry as the "Red Book" specification, which defines an area for storing data known as the Table of Contents (TOC). Since each CD is unique in exact content, it is possible to use some or all of the TOC data as a "fingerprint" to uniquely identify each CD. In addition to using the TOC data for the identifying information, a sample of the actual disc data representing a particular work or compilation can also be used as a fingerprint that uniquely identifies a compact disc. Due to the wide dynamic range of music characterized on each disc, several data samples taken at consistent locations on a disc can also be statistically likely to uniquely identify the disc, either alone or in combination with a portion of the TOC data. By selecting a large enough sampling of data to characterize each disc, it is possible to uniquely identify each disc which has been manufactured and which is likely to be manufactured in the future. However, in the unlikely event that the identifying "fingerprint" for two or more discs is the same, remedies such as user selection of the appropriate disc are contemplated by the present invention. For further description regarding the disc fingerprint, the reader may refer to 1 n red U.S. Pat. No. 6,128,625, entitled "Method and Apparatus for Operating a Database," the contents of which are hereby incorporated by reference.

The fingerprint is preferable to an actual disc identifier that is merely read from the disc, because the fingerprint may prevent hackers from emulating possession of a particular disc in order to fraudulently obtain usage credits. The fingerprint may remain constant, or may change periodically to further prevent hackers from emulating possession.

The identifier, such as the fingerprint, is then transmitted 406 from the client device to the content distribution server, and may also be encrypted for additional security. Upon receipt of the identifier, the server checks its database to determine whether there is an entry corresponding to the identifier. Alternatively, client side software that performs this step could be provided, but such might not be as practical as the fingerprints for all possible discs might require storage, and changes to the fingerprints for particular discs might not be as practical.

It is then determined in step 408 whether a database entry exists for the identifier, and correspondingly that the compact disc has been identified. If it is determined that there is no entry corresponding to the identifier, a message indicating that the disc was not identified is displayed 410. If there is an entry corresponding to the identifier, the disc has been identified, and an appropriate message indicating such can be displayed 412.

Preferably, the content distribution server maintains a variety of web pages that may be displayed in conjunction with identified discs. Thus, continuing with the example where the user inserts the compact disc having the album Murmur by the artists R.E.M., the content distribution server can display a graphical image of the album, a list of the works on the album, and possibly other related promotional information and the like. Preferably, the page also has links that allow the user to purchase a digital download or streaming rights to one or more of the works or the entire album.

Once the disc has been recognized and the message indicating identification of the disc and possibly the above described web page are displayed, the user may be prompted 414 regarding a discounted purchase of an electronic distribution form of a particular work, works or the entire compilation found on the identified disc. A user that responds positively to this prompt is of course given credit for possession and apparent ownership of the identified disc.

Figure 5:
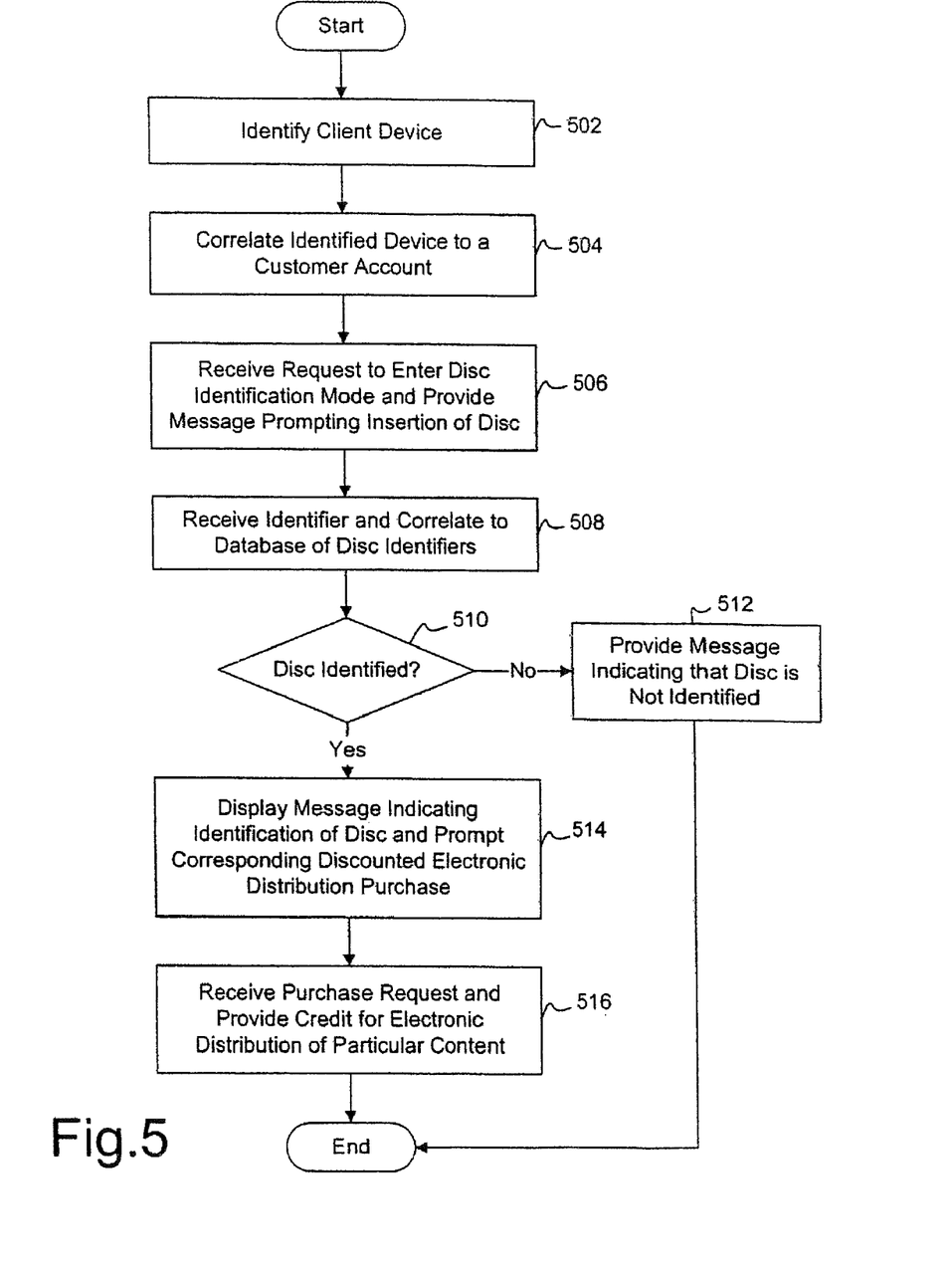
FIG. 5 is flow diagram illustrating an embodiment of a method for providing particularized credit to a user in an electronic content distribution system in accordance with the present invention.

This stage is described further with reference to the server perspective flow diagram of FIG. 5. Referring to that figure, an embodiment of providing particularized credit to a user in an electronic content distribution system, from the server perspective, is now described. Initially, a client device requests communication with the content distribution server and the particular features regarding disc identification. The client device is identified 502 and correlated 504 to a customer account. Preferably, the electronic content distribution server interfaces with the user using conventional web based approaches, including HTML pages that may be readily browsed by appropriate client devices.

Various conventional techniques can be used to allow the user to log in to the system and to validate the accessing hardware, and these two steps may be combined into a single step of identification, validation, and correlation to an account where a user has previously registered and provided identification information for the device. Additionally, conventional "cookie" based approaches can be used for seamless site access and device identification, although such might be slightly less secure than requesting a password to allow the user to log on to the system and using a hardware based device serial number to identify the device.

Once onto the system, the user may navigate among available features. The user may merely want to compile play lists, or merely play back content that the user has previously acquired usage rights for. However, the user of course may also enter a disc identification mode, wherein they may obtain particularized credit for possessing particular compact discs. The content distribution server receives 506 a request to enter the disc identification mode, and provides a corresponding message (or a web page, or a frame within a page) prompting the insertion of a compact disc. Alternatively, the client device (e.g., the content player application (224, FIG. 2) may include software that automatically initiates the disc identification mode once a disc is inserted into the CD drive.

Once the disc is inserted, the client device reads at least a portion of the disc to obtain an identifier, and provides this identifier to the content distribution server as described above. The server receives 508 the identifier and correlates it to a database of disc identifiers. This may be done by conventional scanning of the entries for an appropriate column of information found in the database. If there is no database entry having the identifier, then it is determined 510 that the disc is not identified, and the server provides 512 a message indicating that the disc had not been identified.

If there is a database entry having the identifier, then it is determined 510 that the disc has been identified, and the server displays 514 a message indicating identification of the disc, and prompts a corresponding discounted electronic content distribution based purchase. Preferably, the message is provided in the form of a web page that provides graphical and other information regarding the disc, as well as links for digital downloads, streams, or other electronic distribution modes. The links for the electronic content distribution modes may identify the potential particularized credit. For example, if the price for a single work on the album or compilation is $1.99, the user may be given a 50% credit, such that they will only be charged $0.99 for purchasing the single work by digital download, and such can be readily conveyed to the user in the displayed page. Alternatively, in a streaming environment where works are periodically added to a play list that may be remotely accessed, adding the single work to the list might cost $0.50 without possession/ownership, but could be only $0.25 upon demonstration of possession and apparent ownership in conjunction with this invention.

The server can then receive 516 a purchase request and accord the particularized credit to the user account. Of course, this credit may be in the form of a reduced charge for the particular content. That is, the user account may be charged $0.99 rather than $1.99 for a digital download of a particular work that is also found on the identified compact disc. Here, the $1.00 credit is implied in that the user is charged the lesser amount.

Thus, methods and apparatus for providing particularized credit to a user in an electronic content distribution system have been described in connection with certain embodiment of the present invention. Although the present invention has been described in considerable detail with reference to certain embodiments thereof, other embodiments are possible. For example, although compact discs containing musical works are mostly described in connection with the above embodiments, the invention is equally applicable to other storage media, like DVDs, solid state memory, etc., and other forms of content, like images and video. Therefore, the sprit and scope of the appended claims should not be limited to the description of the preferred embodiments contained herein.

The invention claimed is:

1. A method for receiving credit in an electronic content distribution network system, comprising:
    reading an identifier from a given read only optical storage medium, the identifier indicating that the given read only optical storage medium contains a particular content;
    transmitting the identifier through a network to a server;
    receiving, based on the transmission of the identifier, a credit for allowing access to an additional copy of the particular content;
    redeeming the received credit;
    downloading the additional copy of the particular content upon redeeming the credit; and
    storing the additional copy of the particular content on a storage medium other than the given read only optical storage medium.

2. The method of claim 1, wherein the particular content includes a musical work.

3. The method of claim 1, wherein the particular content includes a musical compilation comprising a plurality of musical works.

4. The method of claim 1, wherein the identifier is a digital fingerprint that identifies the given read only optical storage medium.

5. The method of claim 1, wherein the given read only optical storage medium is a compact disc.

6. The method of claim 5, wherein the network is an Internet.

7. The method of claim 6, wherein the particular content includes a musical work.

8. The method of claim 7, wherein the server downloads the musical work to a user pursuant to a transaction including redemption of the credit by the user.

9. The method of claim 7, wherein the server streams the musical work to a user pursuant to a transaction including redemption of the credit by the user.

10. The method of claim 6, wherein the particular content includes a musical compilation comprising a plurality of musical works.

11. An apparatus for receiving particularized credit in an electronic content distribution system, comprising:
    means for reading an identifier from a given read only optical storage medium, the identifier indicating that the given read only optical storage medium contains a particular content;
    means for transmitting the identifier to a server in the electronic content distribution system;
    means for receiving, based upon the transmission of the identifier, a particular credit for allowing access to an additional copy of the particular content through the electronic content distribution system;
    means for redeeming the received credit;
    means for downloading the additional copy of the particular content upon redeeming the credit; and
    means for storing the additional copy of the particular content other than the given read only optical storage medium.

12. The apparatus of claim 11, wherein the identifier is a digital fingerprint that identifies the given read only optical storage medium.

13. The apparatus of claim 12, wherein the particular content includes a musical work.

14. The apparatus of claim 12, wherein the particular content includes a musical compilation comprising a plurality of musical works.

15. The apparatus of claim 11, wherein the given read only optical storage medium is a compact disc.

16. The apparatus of claim 15, wherein the server downloads the musical work to the user through a network connection pursuant to a transaction including redemption of the particular credit by the user.

17. The apparatus of claim 15, wherein the server streams the musical work to the user through a network connection pursuant to a transaction including redemption of the particular credit by the user.

* * * * *